United States Patent
Pfund

(10) Patent No.: US 7,370,960 B2
(45) Date of Patent: May 13, 2008

(54) METHOD AND APPARATUS FOR VIEWING A GOLF PUTTING GREEN

(76) Inventor: Charles E. Pfund, 165 Highland St., Newton, MA (US) 02465

( * ) Notice: Subject to any disclaimer, the term of this patent is extended or adjusted under 35 U.S.C. 154(b) by 0 days.

(21) Appl. No.: 10/548,726

(22) PCT Filed: Nov. 19, 2004

(86) PCT No.: PCT/US2004/038949

§ 371 (c)(1),
(2), (4) Date: Sep. 9, 2005

(87) PCT Pub. No.: WO2005/051493

PCT Pub. Date: Jun. 9, 2005

(65) Prior Publication Data

US 2006/0158605 A1    Jul. 20, 2006

Related U.S. Application Data

(63) which is a continuation of application No. 10/778,874, filed on Nov. 20, 2003.

(60) Provisional application No. 60/602,144, filed on Aug. 17, 2004.

(51) Int. Cl.
*G02C 7/12* (2006.01)

(52) U.S. Cl. ............................. 351/49; 351/44; 351/47
(58) Field of Classification Search .................. 351/41, 351/44, 47–49, 57–59, 155; 2/10, 12, 13, 2/15, 453; 273/108.2; 474/252
See application file for complete search history.

(56) References Cited

U.S. PATENT DOCUMENTS

| | | | |
|---|---|---|---|
| 3,876,295 A * | 4/1975 | Loughner | 351/47 |
| 5,208,916 A * | 5/1993 | Kelman | 2/10 |
| 5,414,476 A | 5/1995 | Pavelle et al. | |
| 5,444,501 A | 8/1995 | Aloi et al. | |

* cited by examiner

*Primary Examiner*—Huy Mai
(74) *Attorney, Agent, or Firm*—Wolf, Greenfield & Sacks

(57) ABSTRACT

This invention provides binocular eyeglasses that have linear polarizing lenses to be employed by a golfer to examine the surface of a putting green as an aid in deciding the speed and direction of a putting stroke. The planes of maximum transmission for the lenses are preferably complementary each lens 45° to horizontal. The polarizing lenses are supported to permit the golfer to rotate the lenses to "tip-up" position out of the line of sight, which enables the golfer to alternatively see a direct view and a polarizer altered view of the putting surface without significant delay of play.

6 Claims, 3 Drawing Sheets ns: eyes, optic nerves and brain.
METHOD AND APPARATUS FOR VIEWING A GOLF PUTTING GREEN This application is a U.S. National Phase Application filed under 35 U.S.C. §371 from International Application Ser. No. PCT/US2004/038949, filed Nov. 19, 2004, which claims priority both to U.S. patent application Ser. No. 10/717,874, filed Nov. 20, 2003 and to U.S. Provisional Application Ser. No.: 60/602,144, filed Aug. 17, 2004.

FIELD OF THE INVENTION

This invention relates to an aid for viewing a golf putting green to assist in discerning the subtle variations in the putting surface.

BACKGROUND OF THE INVENTION

The game of golf consists of two almost completely independent phases of play for each hole, the first being one or more powerful strokes to advance the ball from the teeing ground to a position on the putting green. The second phase consists of one or more carefully directed light strokes to advance the ball by rolling it into the cup.

Since the game of golf is centuries old and enjoys immense popularity around the world the attention that has been given to each phase of the game is enormous. The design and layout of the course itself, the multitude of club designs for each phase of play, the ball, and the putting green all have been exhaustively treated in both the literature and actual embodiments. The putting green alone remains an enigma that consumes more care and attention per square foot than any other part of the course and more time by the players scrutinizing the surface of the green before deciding on the line and speed for stroking a putt.

BRIEF SUMMARY OF THE INVENTION

The present invention provides for viewing the surface of a putting green to reveal more detail of the putting surface than can ordinarily be seen by the unaided human eye.

As previously mentioned, the putting green surface is essentially unique in the practice of agrology. This preparation is followed by contouring the surface and almost daily attention to the vitality of the grass surface to keep it growing under extremely close mowing. This procedure results in the putting surface that is presented to and closely studied by the serious golfer in preparation for stroking a putt.

The present invention uses linear polarizing lenses to reveal to the player during the normal course of play a unique view of the putting surface in the nature of a mosaic which can supplement the golfer's normal view as an aid in deciding the direction and speed for the putting stroke. The lenses may be preferably clear or tinted, for example they may be only slightly tinted to assure the maximum flux to the retinas. Apparatus is also provided for selective movement of the lenses in and out of the line of sight of the golfer.

DETAILED DESCRIPTION OF THE INVENTION

Figure 1:
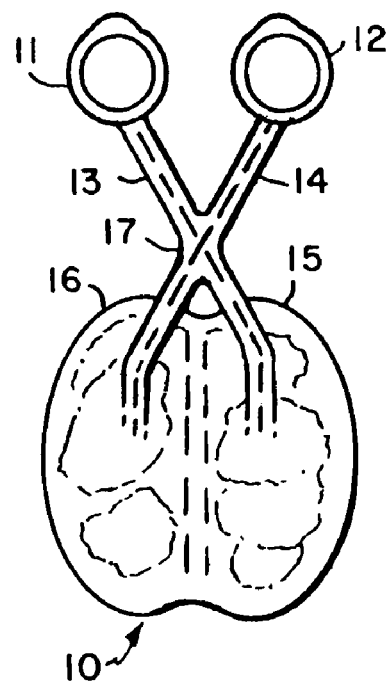
FIG. 1 is a rudimentary sketch of the principle components of human vision: eyes, optic nerves and brain.

FIG. 1 is a rudimentary sketch of the human eye-brain visual complex. A left eye 11 and a right eye 12 form the visual image stumuli on the respective retinas that are conveyed by optic nerves of each eye to the brain 10. As shown, an optic nerve 13 carries these signals from the left eye 11 to a right half 15 of the brain 10 while an optic nerve 14 carries the signals from the right eye 12 to a left half 16 of the brain 10. The crossover of these nerve signals occurs in an optic chiasm 17. Other nerve pathways exist without the crossover pathways.

None of this eye-brain physiology is apparent to an individual with normal eyesight but it provides the essential capability for such an individual to perceive the reality he observes by erecting a coherrent view from the distinct left and right eye signal sources.

The present invention utilizes a unique property of linear polarizers which are oriented with the maximum transmission angles at preferably 90° thereby presenting two distinct images of the same scene to the right and left retinas. These non coherent images are processed by the eye-brain system to present an erect image that emphasizes the subtle surface differences which result from variations in the viewed surface that cannot be seen with the unaided eyes.

In a normal round of golf, a foursome has a starting time between a preceding foursome and a following foursome. The usual interval between starting foursomes is between 8 and 10 minutes and in serious (e.g. tournament) play, each foursome is expected to keep pace without slowing the progress of the players on the course. The Rules of Golf provide serious penalties for infractions including slow play.

Figure 2:
FIG. 2 is a view representing the invention in actual use during putting in a typical foursome round of play.

FIG. 2 shows a golfer 18 in the usual crouch position behind the ball 20 in play using an embodiment 19 for practicing the invention during actual play. The invention provides for rapid easy viewing of the putting surface by the polarizer optical path and the ability to alternate the direct view image and the polarizer altered image rapidly thereby providing the golfer the opportunity to synthesize the two views in his own mental evaluation. The invention thus provides a means for synthesizing an image which has significantly more information than the direct view. The complex analysis as described does not impose any substantial delay compared to the normal care serious golfers use in preparing to putt.

Figure 3:
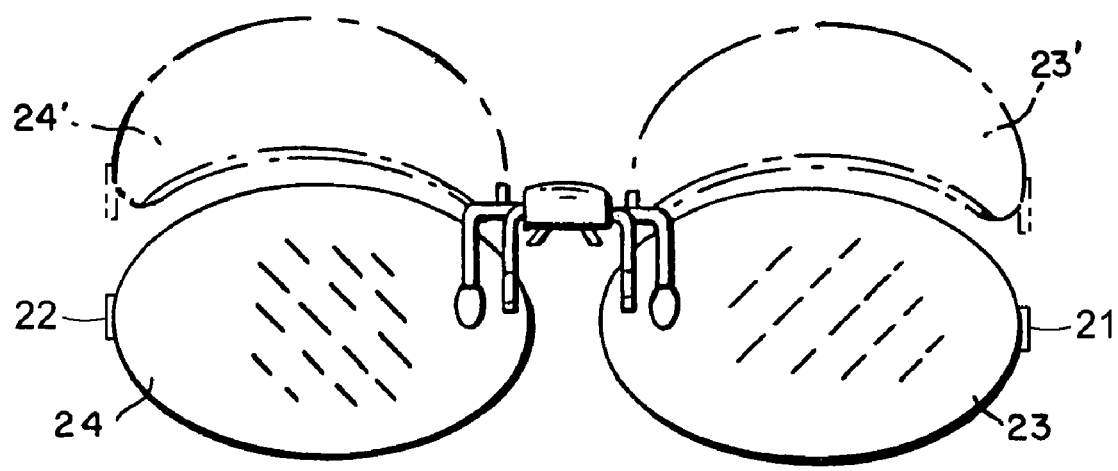
FIG. 3 is a schematic view of a frame such as found in a pair of ordinary clip-on type sunglasses, but with the lenses having 45° complementary linear polarization and being supported on a horizontal pivot axis to permit the lenses to be rotated out of the line of vision of the supporting eyeglasses.

FIG. 3 shows a conventional clip-on type frame, as used in sunglasses, to provide easy temporary attachment to a pair of eyeglasses for a pair of linear polarizer lenses 23 and 24 oriented in a positive dihedral angle, as indicated, at complementary 45° angles of maximum transmission. The lenses 23 and 24 have tabs 21, 22 as an aid so they can be tipped upward, as indicated at 23', 24' in FIG. 3 out of the line of vision of the supporting eyeglasses. This type of frame, in addition to being convenient to use, also permits the golfer to scrutinize the putting surface conveniently with and without the polarized image thereby supplementing the information he can utilize in making his decision on his putting stroke.

Figures 4A, 4B:
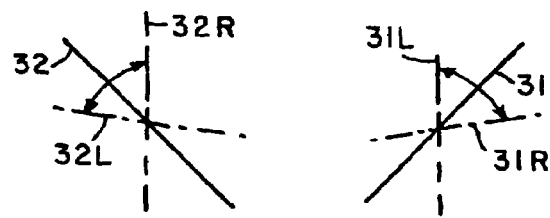
FIGS. 4A and 4B are diagrams illustrating the ability of the golfer wearing the glasses of FIG. 3 to sweep the linear polarization reception angles between approximately zero and ninety degrees.

FIGS. 4A and 4B taken together illustrate a technique the golfer can use to sweep the linear polarization orientation over the field of view. Consider the wearer is looking through the lenses of FIG. 3 with the preferred 45° orientation as described for FIG. 3, that is, looking into and through the plane of the paper.

The plane of polarization of lens 23 in FIG. 3 is indicated in FIG. 4A by the 45° inclination of line 31. Similarly the plane of polarization of lens 24 in FIG. 3 is indicated in FIG. 4B by the 45° inclination of line 32. Now while viewing the putting surface with the glasses of FIG. 3 the golfer by standing erect and tilting his head from side to side can see variations in the putting surface as viewed through complementary angled lenses rotated through a range approaching vertical-horizontal and horizontal-vertical. Thus with a left-tilt of the golfer's head the polarization plane 32 in FIG. 4B approaches horizontal represented as 32L while the polarization plane 31 in FIG. 4A approaches vertical represented as 31L.

The sweep is reversed for a right-tilt of the golfer's head with the plane 31 in FIG. 4A approaching horizontal represented as 31R while the plane 32 in FIG. 4B approaches vertical represented as 32R.

Figure 5:
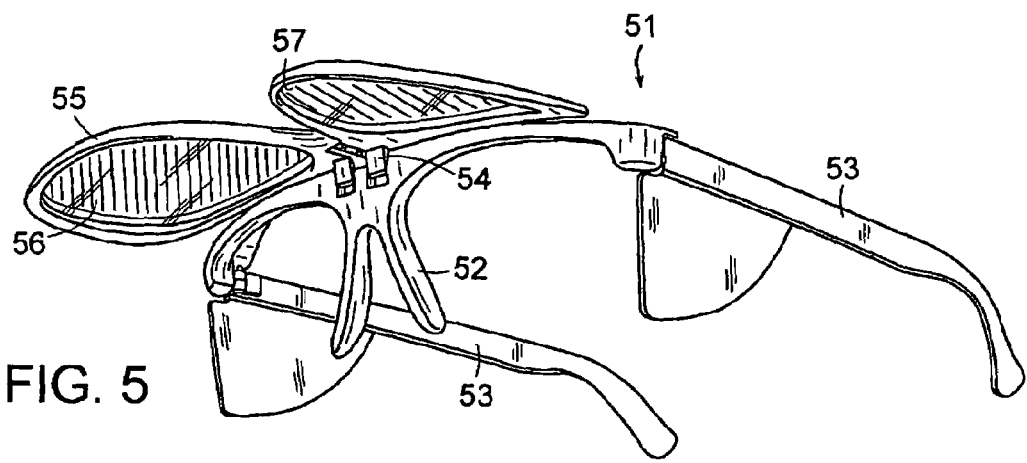
FIG. 5 is a view of an eyeglass frame having the linear polarization lenses supported on a horizontal axis for partial rotation between down for vision through the lenses and in tip-up position, as shown, for clear vision.

FIG. 5 shows the invention assembled in a frame 51 similar to those used by anglers with ordinary sunglass lenses which are usually horizontally polarized. The frame 51 has the usual structures for wearing, such as nosepiece 52 and ear pieces 53. Mounted on the frame by a pivot support 54 is a frame 55 having two lens apertures for supporting the lenses 56, 57 for either line of sight binocular vision through the lenses or tip-up position, as shown, out of the line of sight. In accordance with the invention the lenses 56, 57 are linear polarizer lenses mounted with their planes of maximum transmission oriented approximately 45° to horizontal and approximately complementary.

Figure 6:
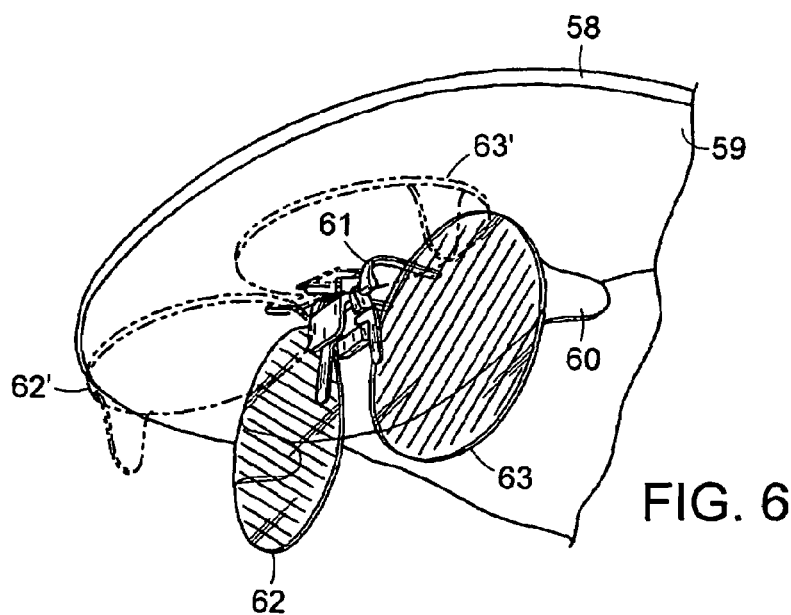
FIG. 6 is a partial view of a headpiece, which supports on a horizontal axis the linear polarizer lenses shown in the wearer's line of vision, said lenses rotatable on said horizontal axis to be stored out of the line of vision of the wearer.

FIG. 6 shows another version of support for wearing this invention such as a cap or sunshade with a forward projecting bill 58 with a substantially flat under surface 59. Supported on said under surface 59 is a frame 61 having two linear polarizer lenses 62, 63 mounted on said frame with planes of maximum transmission being approximately 45° to horizontal when used in the line of vision and approximately complementary. The support frame 61 for said lenses 62, 63 can be pivoted on said undersurface 59 between vertical line of sight and tip-up storage positions. The lenses 62,62 have tabs 60 to facilitate manual "down" and "up" positions.

Thus, as described, the golfer without significant delay of play can view the polarizer altered image of the surface of the putting green and by convenient repetitive altering of his view between direct view and polarizer altered view mentally synthesize a view with significantly more information than is present in the separate views.

Many other embodiments of head supported structures exist suitable for supporting binocular vision lenses in alternate positions of line of sight vision and storage out of line of sight which can be adapted to practice the invention.

What is claimed is:

1. The method of a golfer analyzing the surface of a putting green in preparation for a putting stroke to advance the ball toward the hole comprising the steps of the golfer:
    sighting with binocular vision along a low angle the line between the ball and the hole thereby establishing an ambient light image of the green by ambient light received by said binocular vision of said golfer;
    interrupting the receipt by said golfer of said ambient light image by placing a linear polarizer element before each eye of the golfer thereby creating an altered image received by the golfer, the single planes of transmission of said element for each eye being at approximately 90° to each other, and;
    providing the golfer with the ability to alternate the view he receives between said ambient light image and the said altered image received through the polarizer elements.

2. An aid for a golfer with binocular vision analyzing a putting green on which his ball lies in play during a round of golf comprising:
    a pair of linear polarizer elements with means for supporting said elements to be selectively in or out of the line of said binocular vision of the golfer addressing the putt, the single plane of transmission of each of said elements being at approximately 90° to the other; and
    means for manually operating said selectively in or out position of said elements to provide the golfer with two distinct views of the putting surface.

3. The aid according to claim 2 in which the 90° between said single plane of transmission of said elements is established by orienting each of said elements to form a dihedral angle relative to horizontal.

4. The aid according to claim 3 in which said dihedral angle is positive.

5. A system for synthesizing two images of the same scene where the first image is that perceived by normal binocular vision and the second image is obtained using linear polarizing lenses each having one light-polarizing transmission axis comprising:
    a frame suitable for wearing and supporting two of said linear polarizing lenses mounted for movement in and out of said line of sight, each of the mounted lenses having its respective said transmission axis at a large angle to the axis of the other lens;
    said frame mounting said lenses in an assembly having means for selective manual movement of said assembly in and out of said line of sight thereby providing said two images alternately to the wearer with the rate of erecting the alternating images into said line of sight controllable to synthesize the features of each image.

6. The system of claim 5 in which said large angle is approximately 90°.

* * * * *

UNITED STATES PATENT AND TRADEMARK OFFICE
CERTIFICATE OF CORRECTION

PATENT NO. : 7,370,960 B2  Page 1 of 1
APPLICATION NO. : 10/548726
DATED : May 13, 2008
INVENTOR(S) : Charles E. Pfund It is certified that error appears in the above-identified patent and that said Letters Patent is hereby corrected as shown below:

On the Title Page, Item (63) should read

Related Application Data (63)

--This application is a U.S. National of PCT/US2004/038949, filed 11/19/04, which claims priority from 10/717,874, filed on 11/20/03 and to provisional application 60/602,144 filed 08/17/04.--

Signed and Sealed this

Thirtieth Day of September, 2008

JON W. DUDAS
*Director of the United States Patent and Trademark Office*